July 28, 1959  HISAYOSHI KUBODERA  2,897,017
BEARING
Filed May 21, 1956  2 Sheets-Sheet 1
Fig-1-
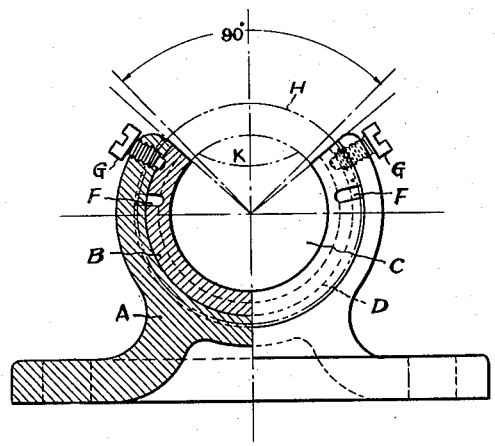
Fig-2-
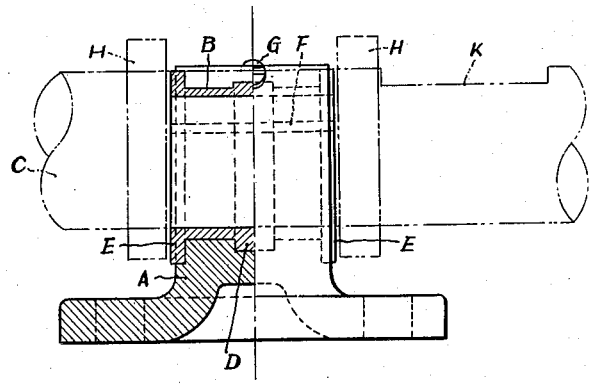
INVENTOR.
H. Kubodera
BY
ATTYS.

July 28, 1959     HISAYOSHI KUBODERA     2,897,017
BEARING
Filed May 21, 1956                          2 Sheets—Sheet 2
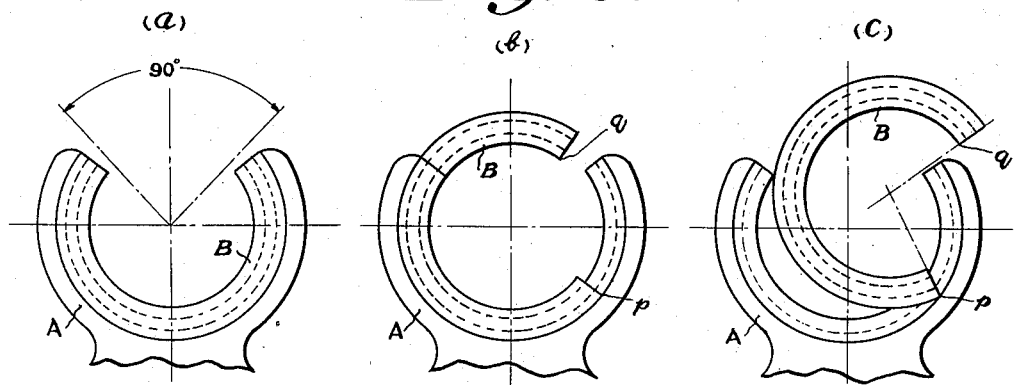
Fig-3-
INVENTOR.
H. Kubodera United States Patent Office 2,897,017
Patented July 28, 1959

2,897,017

BEARING

Hisayoshi Kubodera, Shinjuku-ku, Tokyo-to, Japan

Application May 21, 1956, Serial No. 586,097

Claims priority, application Japan May 30, 1955

3 Claims. (Cl. 308—15)

This invention relates to an improved bearing.

In general, a bushing type bearing provided with a detachable metal lining has disadvantages in that the shaft supported thereby and the metal lining cannot be provided with a boss or ring-shaped projection for the locking of rightward and leftward shifting of said metal lining because of much difficulty in the attachment of said metal lining with its bearing body. Although, in some cases, one end surface of said metal lining can be provided with a ring-shaped flange capable of bearing the thrust, both end surfaces of said lining cannot be provided with said flange.

On the other hand, in a split type bearing composed of two elements which are tightened by screw bolts, the internal surface of each of said elements is equal to or less than half of the bearing circular surface, so that shaft supporting is unstable. Moreover, it is very difficult to protect the shaft from its oscillation and shaking, because said elements should be tightened by screw bolts. If said screw bolts are forcibly tightened to reduce said oscillation and shaking, excess defacement and heating of the shaft and bearing will occur.

In the split type bearing as described above, it has been a practice to put a distance piece or pieces made of sheet iron between the contact surfaces of both elements of the bearing, but said distance piece or pieces should be firmly tightened for making the bearing stable, so that the tightening of both the elements by screw bolts cannot be continuously adjusted and it is impossible to compensate fine relaxation due to defacement by adjusting the screw bolts.

An important object of this invention is to provide a bearing having no such disadvantages as described above and capable of being easily assembled or disassembled even when both end surfaces of the metal lining are, respectively, provided with ring-shaped flanges to lock rightward and leftward shifting of the metal lining or to bear the thrust.

A further object of this invention is to provide an economical bearing which is very simple while having such advantages as described above.

The novel features of this invention are set forth with particularity in the appended claims. This invention, however, both as to its construction and manner of application together with further objects and advantages thereof may best be understood by reference to the following description, taken in connection with the accompanying drawings, in which:

Fig. 1 is a front view of an embodiment of this invention, vertically sectioned in the left half side thereof.

Fig. 2 is a side view of the embodiment in Fig. 1, vertically sectioned in the left half side thereof.

Figs. 3(a), (b) and (c) are schematic front views of the bearing according to this invention, said views showing different relative positions between the bearing body and the metal lining in the assembling or disassembling step.

Referring to Figs. 1 and 2, the bearing consists of a bearing body A and a metal lining B, and within said lining B is supported by a shaft C. Said bearing body A has a peripheral portion cut away to the extent of from ¼ to ½ thereof while leaving more than a semi-circular surface thereof. Similarly, said metal lining is so cut as to form an axially elongated cut part and as to leave more than a semicircular surface thereof.

According to said construction of the bearing, cut parts of the bearing body A and the metal lining B extend over a central angle greater than 90°, as shown in Fig. 1, so that detachment of the metal lining B from the bearing body A can be readily carried out by rotating the metal lining B relative to the bearing body A from the position as shown in Fig. 3(a) to the position as shown in Fig. 3(b) and then by rotating the metal lining B clockwise around the end point p thereof while pushing outwards the other end part q of said lining B so as to bring said lining to the position as shown in Fig. 3(c). Attachment of the metal lining B to the bearing body A can be readily done by reversely carrying out said detaching operation.

According to the bearing as shown in Figs. 1 and 2, the metal lining B is in contact with the shaft C in the surface larger than its half peripheral surface, so that besides simple construction and simple assembling and disassembling of the bearing members, there will be obtained other various advantages in that said shaft C does not become removed from said metal lining during rotation of said shaft and operation thereof is very stable as in the case of the conventional bushing type bearing; that inspection of shaft defacement and dust cleaning is easy due to the existence of the cut parts of the bearing body and the metal lining; and that the outer surface of the metal lining B can be formed as an arcuate surface suitable for the absorption of shaft oscillation and the metal lining B can be equipped with a collar D to lock rightward and leftward shifting of said lining and with collars E to take the thrust of the collars H which are attached to the shaft C. Furthermore, when the metal lining B is defaced, adjustment of said metal lining can be readily carried out by pushing inward the end parts thereof. In this case, a certain gap is apt to occur between the metal lining and the bearing body, but said gap causes no defect, because it is easy to protect the metal lining from its shifting by providing such collars D and E as shown in Figs. 1 and 2. Moreover, said adjustment can be continuously carried out, for instance, by providing screws G which are so screwed in both end parts of the bearing body A as to push both end parts of the metal lining B, so that smooth compensation of the defacement of the lining will be effectively and simply carried out.

Said adjustment can be more easily done by providing such cut parts F on the outside of said metal lining B as shown in Figs. 1 and 2.

The cut parts of the bearing body and the lining according to this invention, if necessary, may be covered by a suitable cover to protect them from dust.

As a whole, the bearing of this invention is very simple in its construction, economical in its manufacture, very effective in its function, and very easy in its assembling, disassembling and adjustment.

The lining of this invention may be made of any material, for example, single metal, metal alloy, synthetic resin, oil containing wood and the like.

When the bearing of this invention is applicable for supporting the shaft C such as shown by dot-and-dash lines in the drawing, said shaft is provided with an axially elongated concave portion K in its outer surface.

While I have illustrated particular embodiments of my invention, it will, of course, be understood that I do not wish to be limited thereto, since many modifications may

What I claim is:

1. A bearing comprising a bearing body and a lining therefor, said body and lining being provided with cutaway portions providing opposed edges in symmetrical relation to a vertical axial plane and in angular relation of between 90° and 180° to each other, said lining having engagement with said body for initial rotational movement about the common axis of the body and lining and for subsequent rotation about one end thereof for facilitating positioning of the lining in the body and for removal thereof from the body, said lining being provided with a unitary central collar and opposite and unitary collars, said body being provided with arcuate recesses in which said collars are disposed, and means removably securing said lining and said body against relative rotation about said common axis in the assembled position of the lining in said body with said edges axially aligned relative to said common axis.

2. A bearing comprising a bearing body and a lining therefor, said body and lining being provided with cutaway portions providing opposed edges in symmetrical relation to a vertical axial plane and in angular relation of between 90° and 180° to each other, said lining having engagement with said body for initial rotational movement about the common axis of the body and lining and for subsequent rotation about one end thereof for facilitating positioning of the lining in the body and for removal thereof from the body, said body being provided with threaded apertures adjacent said opposed edges, and screws disposed in said apertures and being engageable with said lining to adjust the gap between the lining and a shaft rotatably journaled therein.

3. The structure according to claim 2, wherein said lining is provided with axially extending slots for receiving said screws.

References Cited in the file of this patent
UNITED STATES PATENTS

| | | |
|---|---|---|
| 265,047 | Fenner | Sept. 26, 1882 |
| 1,152,477 | Bixby | Sept. 7, 1915 |
| 1,312,269 | Rhoades | Aug. 5, 1919 |
| 1,458,172 | Dull | June 12, 1923 |
| 2,039,192 | Schober et al. | Apr. 28, 1936 |